United States Patent
Hurme et al.

(10) Patent No.: US 7,167,556 B1
(45) Date of Patent: Jan. 23, 2007

(54) CIRCUIT AND METHOD FOR STIMULATION OF A TELEPHONE APPARATUS

(75) Inventors: Harri Hurme, Espoo (FI); Timo M. Tamminen, Helsinki (FI); Jari Koskela, Helsinki (FI)

(73) Assignee: Tellabs Oy, Espoo (FI)

( * ) Notice: Subject to any disclaimer, the term of this patent is extended or adjusted under 35 U.S.C. 154(b) by 0 days.

(21) Appl. No.: 09/700,272

(22) PCT Filed: May 11, 1999

(86) PCT No.: PCT/FI99/00396

§ 371 (c)(1),
(2), (4) Date: Jan. 12, 2001

(87) PCT Pub. No.: WO99/59327

PCT Pub. Date: Nov. 18, 1999

(30) Foreign Application Priority Data

May 11, 1998 (FI) .................................... 981039

(51) Int. Cl.
*H04M 1/00* (2006.01)
(52) U.S. Cl. .............................. 379/399.01; 379/413.02
(58) Field of Classification Search .... 379/399.01–413
See application file for complete search history.

(56) References Cited

U.S. PATENT DOCUMENTS

| | | | | |
|---|---|---|---|---|
| 4,458,112 A | * | 7/1984 | Svala | ........................ 379/413 |
| 5,125,027 A | * | 6/1992 | Blaszykowski et al. | ..................... 379/399.01 |
| 5,402,485 A | * | 3/1995 | Takato et al. | ............... 379/413 |
| 5,515,434 A | | 5/1996 | Cotreau | |
| 5,659,570 A | | 8/1997 | Cotreau et al. | |

FOREIGN PATENT DOCUMENTS

GB 2132448 7/1984

* cited by examiner

*Primary Examiner*—Daniel Swerdlow
(74) *Attorney, Agent, or Firm*—Young & Thompson

(57) ABSTRACT

An electric device (202, 301) for connecting an analogue data transfer device (202) by means of a control unit (203) to a digital transfer system comprises means for connecting to a data transfer device via a twin cable (204). In addition, it comprises a current amplifier arrangement (214, 314, 340) for feeding a certain current to the twin cable, a first current switching device (219) for switching a first control current to the current amplifier arrangement, and a second current switching device (220) for switching a second control current to the current amplifier arrangement. The current switching devices (219, 220) are preferably current mirrors.

17 Claims, 3 Drawing Sheets

CIRCUIT AND METHOD FOR STIMULATION OF A TELEPHONE APPARATUS

Figure 1:
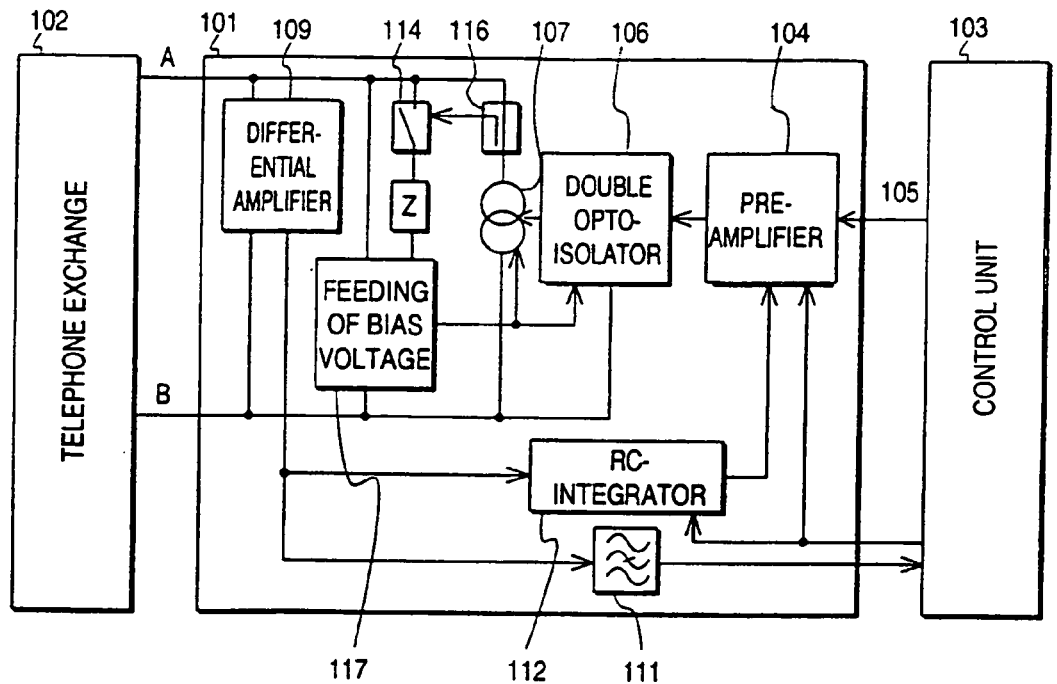

This invention relates to data transfer arrangements between the telephone exchange and the subscriber apparatuses in telephone systems. More particularly the invention relates to a circuit which is used to simulate an analogue telephone apparatus in a system with an analogue telephone exchange and digital transfer connections.

The conventional arrangement in an analogue telephone system is to draw a separate twin cable line to each subscriber device, typically a telephone apparatus. In digital systems it is possible to distribute the capacity represented by the same physical medium to many subscribers, because many telephone calls can be simultaneously transferred in the same line as multiplexed. If a digital transfer connection is added to an analogue telephone exchange, a circuit which functions as an analogue telephone apparatus for the telephone exchange is needed at the exchange end of the transfer connection. A circuit like this is called an office line interface circuit (OLIC). If the telephone device is also analogue, the telephone apparatus end of the transfer connection requires a circuit which makes the digital transfer connection look like an analogue connection to the telephone apparatus. A circuit like this is called a subscriber line interface circuit (SLIC). The present invention relates to the office line interface circuits.

The ON-hook status generally means a status of the telephone system in which the telephone is not in use. The OFF-hook status in turn means a status of the telephone system in which the telephone handset is lifted from the cradle. The office line interface circuit must have at least the following functions:

it must be able to send and receive electric audio frequency signals simultaneously, in the OFF-hook status it must switch on a so-called DC loop current, in the ON-hook status it must prevent the flow of the DC loop current or switch on only a very small DC loop current.

it must produce the selection pulses according to the commands coming from the direction of the terminal equipment by switching the DC loop current on and off, it must detect a call, payment pulses and reversal of input polarity in a telephone line, it must be immune to common-mode signals in a telephone line and it must not send them itself, it must have a high impedance in the ON-hook status in relation to the telephone exchange, and in the OFF-hook status it must simulate a loop impedance of the required magnitude both at audio frequencies and payment pulse frequencies (generally 12 or 16 kHz) and it must separate electrically the components connected to the telephone line, which float in relation to the local ground potential, and the components of the OLIC and the digital transfer connection, which are dependent on the local ground potential.

In the latter operation it must also be taken into account that the voltage of the telephone line can be relatively high. The current which runs from the telephone exchange along the first wire of the twin cable to the OLIC and along the second wire of the twin cable back to the telephone exchange is called DC loop current.

Especially the electric separation between the telephone line and the digital transfer connection has been complicated in the design of OLICs. A known solution is to use a gyrator, or a circuit which simulates a serial connection with a high inductance and a relatively low resistance or a similar RL circuit. The purpose of the gyrator is to pass through the desired loop current but to have a sufficiently high impedance at speech frequencies. The gyrator is switched on the line in the OFF-hook status and off the line in the ON-hook status. The DC impedance of the gyrator is often so high that a separate switch is also needed to switch on the selection pulses. Relays and/or transformers are used in most of the known solutions, which makes the OLIC large and expensive to manufacture.

The Finnish patent application FI-935873 discloses a more advanced OLIC 101 as shown in FIG. 1, which is connected to the telephone exchange 102 by means of a twin cable A, B, and to a digital transfer system with a capacity of 2 Mbit/s by means of a control unit 103. The required A/D and D/A conversions are carried out in the control unit, and thus the OLIC processes analogue signals only. The audio frequency signals come from the control unit along the connection 105, and they are transmitted via a pre-amplifier 104 to a double opto-isolator 106, which controls the current generator 107 connected to the twin cable A, B. The audio frequency signals of opposite directions come from the twin cable A, B via a differential amplifier 109 and a passband filter 111 to the control unit. From the differential amplifier 109, there is also a connection via the RC-integrator 112 to the pre-amplifier 104 for producing a feedback which aims at keeping the voltage of the twin cable A, B constant. A relatively small impedance Z is switched to the twin cable A, B in the OFF-hook status by means of a detector 116 and a switch 114. The block 117 produces a bias voltage to the double opto-isolator 106 and the current generator 107 from the loop current. The detection of the ON or OFF-hook status comes from the control unit to the RC-integrator 112 and the pre-amplifier 104. The transmission of the selection pulses takes place preferably by switching the voltage on and off on the ON and OFF-hook status detection line.

With regard to electric isolation, the central component in the arrangement shown in FIG. 1 is the double opto-isolator 106. It has been found that the manufacturers of double opto-isolators cannot keep the amplification coefficient of their products sufficiently constant, and so the amplification coefficients of double opto-isolators are rather individual. Because of this, each telephone channel according to FIG. 1 must be calibrated separately both as new and always when the double opto-isolator must be changed for some reason. The calibration causes a remarkable extra workload for the installers and maintainers of the equipment.

Another drawback of the arrangement shown in FIG. 1 is the complicated construction of the current generator needed in it. A controlled current generator is a circuit device in which the current of its output terminals is determined by the control of the current generator with a certain coefficient. The voltage of the output terminals should not be dependent on the current generator itself, but it must be determined by other circuit connections, that is, the output terminals of the current generator float in relation to other voltages in the circuit. The current generator can be voltage controlled or current controlled, but in both cases all known current generators have somewhat non-floating control, that is, they have requirements for the reference potential of the control signal in order to function as intended. In the arrangement of FIG. 1, the isolation of the control signal from the voltages related to the digital transfer system is implemented by means of a double opto-isolator, but if there is an attempt to avoid opto-isolation for the above mentioned reasons, the problem is that a suitable floating real current generator is not known.

The use of a current generator also entails the problem that it requires a lot of internal loop gain in order to be a real current generator and not just a much less ideal and thus more easily implemented current amplifier. It is possible to implement this required internal gain of the current generator by means of a low power operational amplifier solution, which means using a sufficiently multistage, especially low-current amplifier. Even in this case, certain bias voltage development circuits are needed, because the amplifier must float in relation to the reference ground of it environment. As a whole, the circuit solution becomes rather complicated.

It is an objective of the present invention to provide a new kind of an OLIC in which the above described problems of the prior art are eliminated or their impact has been reduced. Especially, the invention aims at providing an OLIC which is small and has low manufacturing costs.

The objectives of the invention are achieved by regulating the flow of the line current with a current amplifier, which is controlled by two current mirrors or a corresponding current switching device.

The device according to the invention is characterized in that it comprises a current amplifier arrangement for feeding a certain current to a twin cable, a first current switching device for switching a first control current to the current amplifier arrangement, and a second current switching device for switching a second control current to the current amplifier arrangement.

The invention also relates to a method for simulating an analogue telephone apparatus. The method according to the invention is characterized in that the loop current running in the twin cable is amplified by means of a current amplifier arrangement, and the current amplifier arrangement is controlled by means of a first current switching device and a second current switching device.

In the OLIC according to the invention, the gyrator or current generator used in the prior art is replaced by a simple current amplifier, which is controlled by means of two current mirrors. The first current mirror is coupled between a relatively high positive supply voltage and the current amplifier, and the second current mirror is coupled between the current amplifier and a relatively low supply voltage. The first current mirror is controlled partly by providing feedback from the voltage between the wires of the telephone line and partly by using an audio frequency signal received from the direction of the digital transfer system as a control signal. In addition, the first current mirror can be controlled by selection pulses received from the direction of the digital transfer system. The control signal of the second current mirror is received from the first current mirror.

The operation of a current amplifier used in accordance with the invention need not be frequency dependent as such, like the prior art gyrator, because the desired frequency dependency can be built in the feedback loop, which controls the operation of the current amplifier by means of the current mirrors. On the other hand, the use of current mirrors removes the need to use opto-isolators, and thus the problems caused by different amplification coefficients are avoided.

The immunity to common-mode signals of the device according to the invention can be improved by implementing the current amplifier as a coupling of two parallel current amplifiers, which are affected by common-mode signals differently. Thus the first current amplifier is controlled by the signal given by the first current mirror, and the second current amplifier is controlled by the signal given by the second current mirror.

In addition to the current amplifiers, the OLIC according to the invention comprises means for detecting the polarity of the telephone line, an isolation amplifier for amplifying the signals received from the direction of the telephone exchange and for transmitting them to the digital transfer system, as well as a line impedance and a switch by which the line impedance can be switched to the telephone line, when needed.

Figure 4:
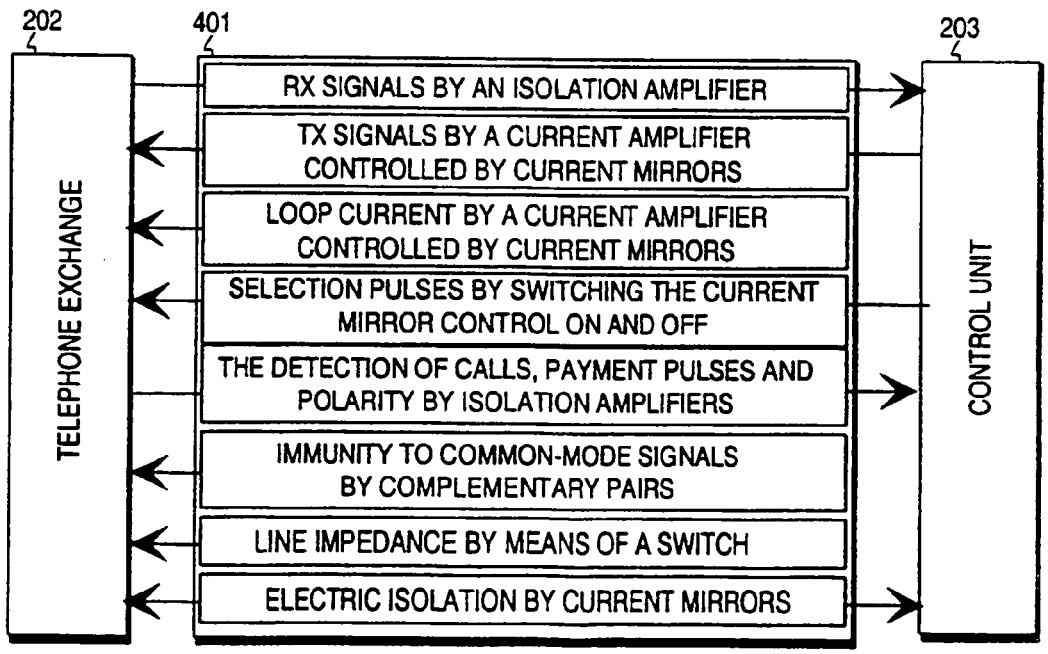
Figure 2:
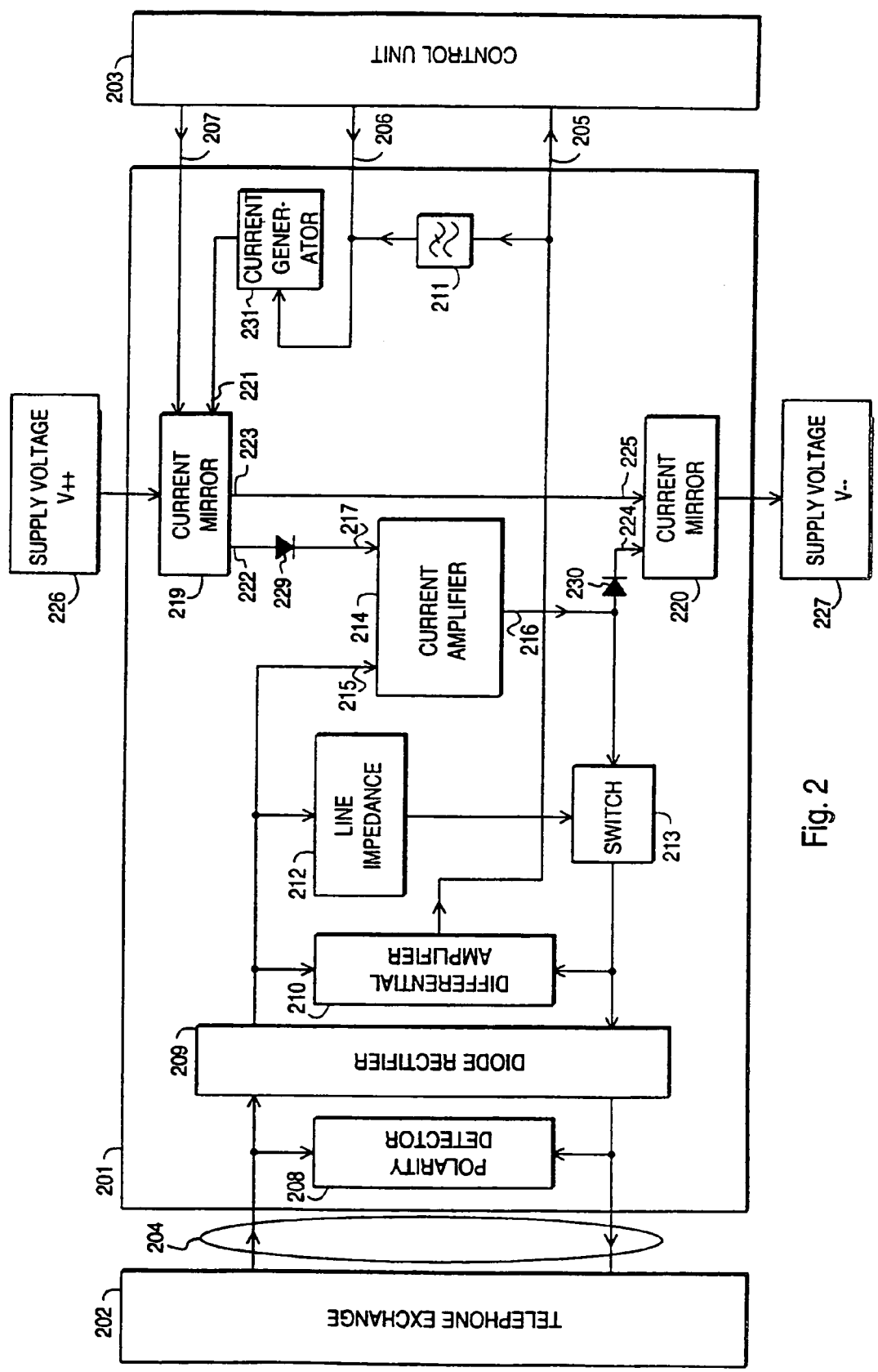
Figure 3:
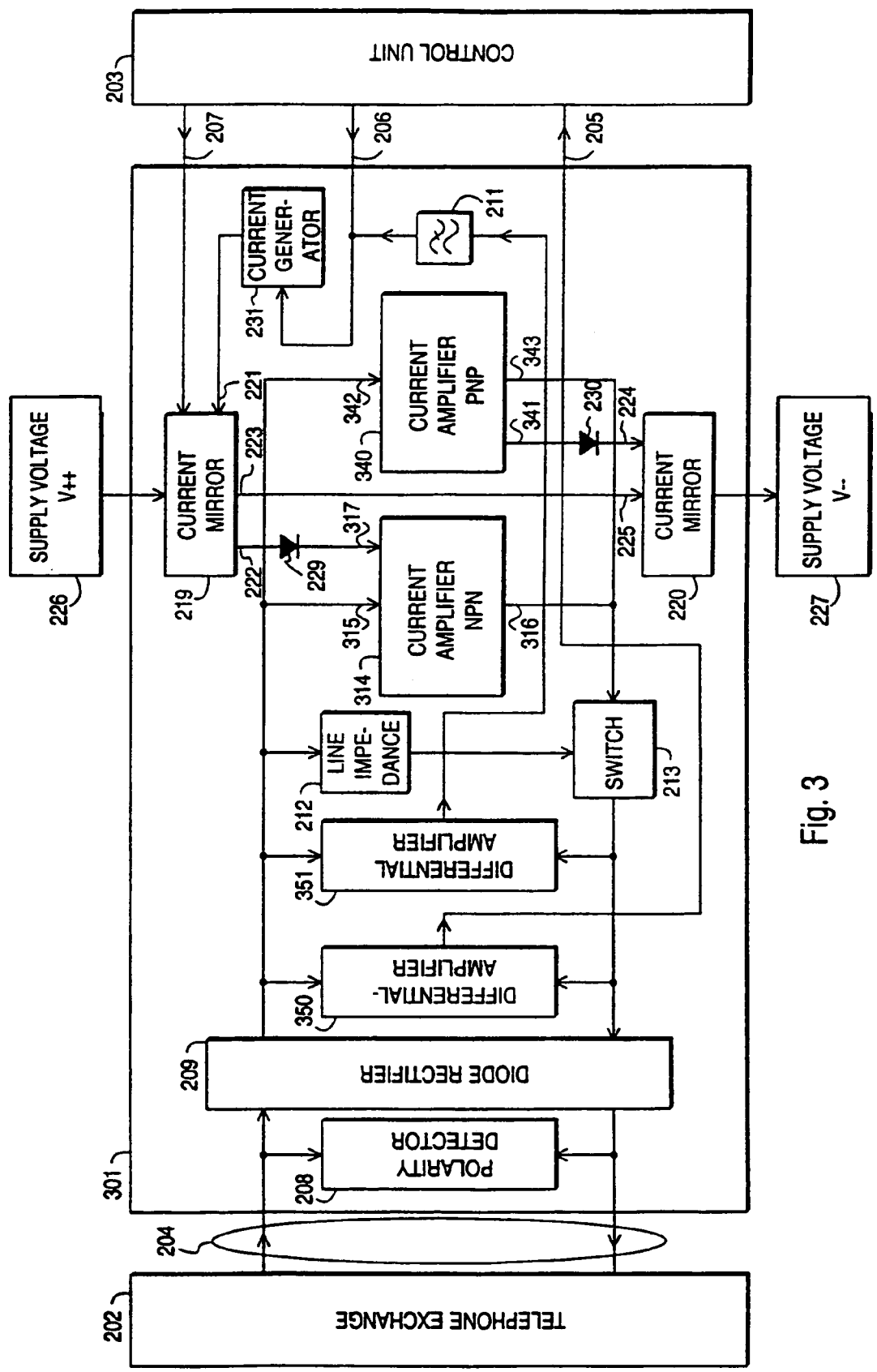

In the following, the invention will be described in more detail with reference to the examples of preferred embodiments and the accompanying drawings, in which FIG. 1 shows a prior art OLIC, FIG. 2 shows an OLIC in accordance with a first embodiment of the invention, FIG. 3 shows an OLIC according to a second embodiment of the invention, and FIG. 4 illustrates a method in accordance with the invention.

Above in connection with the description of the prior art, reference was made to FIG. 1, and in the next description of the invention and its preferred embodiments reference will be made mostly to FIGS. 2 to 4. In the figures, the same reference numbers are used for corresponding parts.

FIG. 2 shows an OLIC 201 in accordance with the invention, located between an analogue telephone exchange 202 and a prior art OLIC circuit controller 203. The controller 203 can be of the kind described in the above mentioned patent application number FI-935873. The OLIC 201 is connected to the telephone exchange by a twin cable 204, and it is connected to the control circuit by at least connection 205 for an audio frequency reception signal, connection 206 for an audio frequency transmission signal, and connection 207 for selection pulses.

Transmission and reception are here defined so that signals directed from the telephone apparatus via the digital transfer system and OLIC to the telephone exchange are transmission signals, and signals directed from the telephone exchange via the OLIC and the digital transfer system to the telephone apparatus are reception signals.

In the OLIC, the twin cable 204 is coupled to a polarity detector 208, which can be a high-impedance differential amplifier, known as such. The information about polarity in the twin cable given by it can be used in a manner known as such. In addition, the twin cable is coupled to a diode rectifier, the use of which is known as such, and the purpose of which is to allow the polarity of the twin cable to be reversed without having an effect on the operation of the OLIC. In accordance with the general practice in the field, the twin cable is drawn after the diode rectifier 209 (on the right side of the diode rectifier in the figure) as if it continued through the diode rectifier, and many components after the diode rectifier are said to be connected to the twin cable, as if there were no diode rectifier there.

The twin cable is, after the diode rectifier 209, connected to a differential amplifier 210, which has two purposes in the embodiment of the invention according to FIG. 2. Firstly, it produces an audio frequency reception signal, which is led via the reception coupling 205 to the control circuit 203 of the OLIC. In addition, the signal produced by it is led via the low-pass filter 211 to the feedback loop, the purpose and operation of which will be referred to later. A line impedance 212 with a switch 213 to control it is also connected to the twin cable in parallel with the differential amplifier 210. The line impedance 212 is generally intended for producing a small impedance in the OFF-hook status, and its purpose and dimensioning will be referred to later.

In the embodiment of the invention shown in FIG. 2, the current amplifier 214 is the component which replaces the prior art gyrator or current generator. The current amplifier 214 simply provides a current component between the input 215 and the common output 216, the relation of the current component to the control current between the control input 217 and the common output 216 being determined by a certain amplification coefficient. (A current amplifier is often a three-terminal device, such as a transistor, Darlington transistor or channel transistor (FET), and thus the second control terminal of the amplifier, or the control output is common with the output terminal). For providing the control current of the current amplifier 214, the embodiment of the invention illustrated by FIG. 2 includes a first current mirror 219 and a second current mirror 220. A current mirror is a known electric coupling, which is controlled by a certain control current, which can be directed into the current mirror coupling or out therefrom, depending on the construction of the current mirror. The basic function of the current mirror is to produce a current of the same magnitude as the control current going to another coupling. The first current mirror 219 shown in FIG. 2 is a so-called double current mirror; its control connection is denoted with 221, and it has two output connections 222 and 223. Thus the current mirror 219 constitutes an outward current from each output connection 222 and 223, the magnitude of each being the same as that of the current directed to the control connection 221. The second current mirror 220 is a simple current mirror, which constitutes a current directed inward from the connection 224, the magnitude thereof being the same as that of the control current directed to the control connection 225. The control current is led to the control connection 225 from the second output connection 223 of the first current mirror.

To make sure that the current mirrors 219 and 220 operate correctly regardless of the differences in the ground potential between the telephone exchange and the OLIC equipment, their operating power is constituted by a relatively high positive supply voltage 226 and a relatively low negative supply voltage 227. The first current mirror 219 is coupled to the positive supply voltage 226 and the second current mirror 220 is coupled to the negative supply voltage 227. The values of the supply voltages are selected such that the ground potential of the telephone exchange is between them in all circumstances. In a typical implementation, the potential difference between the supply voltages is 100 to 150 volts. The physical distance between the telephone exchange and the OLIC equipment is generally not very long, and thus there is not a very big difference between their ground potentials. The typical potential difference between the supply voltages is not so big that the coupling could not be implemented by using generally available semiconductors, which stand high voltages. Note that in an OLIC system, which comprises many OLICs for different telephone lines, all OLICs can use the same supply voltages 226 and 227.

The current provided by the first current mirror 219 is led from the output connection 222 to the control input 217 of the current amplifier 214, and the current provided by the second current mirror 220 is led from the common output 216 of the current amplifier 214 to the input connection 224. Thus the current amplifier 214 constitutes a current component between the input 215 and the output 216, and its relation to the control current between the control input 217 and the common output 216 is determined by the amplification coefficient of the current amplifier 214.

Protection for the coupling can be provided by forward connected diodes 229 and 230 between the first current mirror 219 and the current amplifier 214, and between the current amplifier 214 and the second current mirror 220.

The formation of the control current to be led to the control input 221 of the first current mirror 219 in the embodiment of the invention illustrated by FIG. 2 is described in the following passage. A low pass filter 211 filters the audio frequency components away from the signal provided by the differential amplifier 210, whereby a direct voltage component comparable to the desired line current remains. On the other hand, an alternating voltage component comparable to the transmission signal is received from the OLIC controller via the connection 206, and this alternating voltage component is summed to the direct voltage component. The voltage signal thus received is used to control the current generator 231, which produces a current comparable to the strength of the voltage signal. This current is led as control current to the control input 221 of the first current mirror 219.

In the embodiment of the invention shown in FIG. 2, the connection 207 intended for the selection pulses is led to the first current mirror 219 as an extra control signal. It can be used as an enable/disable arrangement, that is, when the system is in the OFF-hook status and the line current should be guided by the current mirrors 219 and 220, the selection pulses brought to the current mirror 219 via the connection 207, the operation of the current mirrors 219 and 220 and thus the flow of the line current can be switched on and off, and the telephone exchange detects this as a similar phenomenon as the selection signals produced by an analogue telephone device.

The operation of the line impedance 212 and the switch 213 will be described in the following passage. The switch 213 can be a simple transistor switch or other semiconductor switch, the operation of which is regulated by the magnitude of the line current. It is assumed in the figure that the line current runs through the switch 213 (right to left in the figure), but the switch can also be implemented by measuring the rate of the line current by a separate measurement coupling, which gives a certain response when the rate of the line current exceeds a certain threshold value. Building a switch like this as well as a switch outlined in FIG. 2 is a technique which is as such known to a person skilled in the art. In any case, the purpose is that when the line current exceeds the threshold value, which means changing from the ON-hook status to the OFF-hook status, the switch 213 switches the line impedance 212 in parallel with the isolation amplifier 210 and the current amplifier 214. The value of the line impedance can be influenced by changing the switching coefficient between the signals running in the connections 205 and 206 in the control circuit 203. A suitable fixed value can be selected as the value of the line impedance, or the required customer-specific selection can be made by changing the switching coefficient. This also has the advantage that the physical value of the line impedance 212 can be selected such that the OLIC circuit directly fills the impedance values required for the payment allocation pulses with the payment pulse frequency.

The embodiment of the invention illustrated in FIG. 2 has the drawback of being sensitive to common-mode signals that occur in a telephone line. Many semiconductor current mirror solutions are known in the prior art, but in all of them the impedance of the current output terminal is several megaohms or even tens of megaohms, which is very high for ordinary applications. On the other hand, the input impedance of the control terminal in practical current amplifier solutions is inevitably rather high, e.g. some kilo-ohms, in order to make the amplification coefficient of the current amplifier sufficiently high. Thus the common-mode interference voltage coupled to the telephone line gets to the common output of the current amplifier 214, from which it is coupled through the input impedance of the current amplifier and the output impedance of the current mirror 219 to the ground, which is the second reference of the common-mode signal. The coupling is very weak, and in ideal circuit devices even non-existent, but in practical circuit devices strong enough not to be ignored. In the solution illustrated in FIG. 2, the unwanted coupling causes a control signal component to the current amplifier 214, which component is in the normal manner transferred to the output in the current amplifier; however, the output represents a transverse line current, whereby an unwanted transverse interference caused by the common-mode signal is created. The requirements for attenuation of the common-mode signals of a telephone connection are so high that in practice it may be difficult to find such dimensioning for the circuit solution described above that it would meet all the requirements with sufficient certainty.

The problems described above can be eliminated with the arrangement shown in FIG. 3. The OLIC 301 shown in FIG. 3 is almost similar to the OLIC 201 shown in FIG. 2. The important difference which relates to eliminating the above described problems is the fact that there are now two current amplifiers: a first current amplifier 314 and a second current amplifier 340, which is connected in parallel with the first one and constitutes a complementary pair with it. Complementary pairs mean components or circuit solutions which have analogue constructions, but in which the polarities of direct voltages and currents are opposite. Bipolar transistors of the type PNP and NPN are examples of complementary pairs. The arrangement of the current mirrors 219 and 220 in relation to the current amplifiers 314 and 340 is such that from the output 222 of the first current mirror 219 current is led (through diode 229) as control current to the control input 317 of the first current amplifier 314, and from the control output 341 of the second current amplifier 340 current is led (through diode 230) to the input 224 of the second current mirror 220.

In the solution shown in FIG. 3, the control current produced by the first current mirror 219 thus runs from the common output 316 of the current amplifier 314 through the telephone line to the telephone exchange 202 as part of the loop current. The control current of the current amplifier 314 is contained as a partial component in the return current from the telephone exchange 202, and it is led to the common output 342 of the current amplifier 340, therefrom to the control output 341 of the current amplifier 340 and further to the second current mirror 220. This arrangement has the advantage that although the above mentioned harmful transition between the common-mode/longitudinal-form interference voltages still occurs, it occurs mostly in the complementary pairs 314 and 340 equally high but opposite and is thus annulled.

Another difference between the embodiments shown in FIGS. 2 and 3 is the fact that in FIG. 3 the differential amplifier 210 is replaced by two separate differential amplifiers 350 and 351, the first of which is an AC-coupled differential amplifier 350, which has a low amplification coefficient at the 25 Hz call frequency and a higher one in the audio frequency and payment pulse frequency range. The first differential amplifier 350 produces a signal comparable to the audio frequency and/or payment pulse frequency signal, which is led to the reception connection 205.

The second differential amplifier 351 is a DC-coupled differential amplifier, which gives a control signal comparable to the line voltage via the low-pass filter 211 to the feedback loop, which controls the operation of the current mirror 219. The strength of the line current can also be conveniently measured from the second differential amplifier 351 as a voltage measurement. The solution based on two separate differential amplifiers can also be applied in the embodiment shown in FIG. 2.

The embodiments of the invention described above are naturally only examples, and they do not have a limiting effect on the invention. The current mirrors shown in FIGS. 3 and 4 can be replaced by other known circuit devices, which couple different currents in the manner described above. Besides OLICs, the same inventional idea can be applied in other circuits where isolation is required between two systems in different reference potentials. The term "twin cable" can be understood very widely, whereby it means any wired connection in which at least two conductors are used for transmitting a signal in the same way as in the known analogue telephone systems.

FIG. 4 illustrates the method according to the invention as a schematic diagram. Block 401 represents an OLIC, which is situated between an analogue telephone exchange 202 and a control unit 203, and which could be an OLIC according to FIG. 2 or an OLIC according to FIG. 3. Prior art operations as such are the transmission of RX signals with an isolation amplifier, the detection of calls, payment pulses and polarity by means of a signal given by the isolation amplifier and switching the line impedance by means of a switch. The current mirror control described above provides the possibility for transmitting TX signals, for switching a loop current, for transmitting selection pulses and for electrical isolation. The use of complementary amplifier pairs improves the immunity of the OLIC against common-mode signals.

The invention claimed is:

1. An electric device (201, 301) for connecting an analogue data transfer device (202) by means of a control unit (203) to a digital transfer system, comprising means for connecting to a data transfer device with a twin cable (204), characterized in that it comprises
   a current amplifier arrangement (214, 314, 340) for looping a certain current fed into the twin cable from its other end,
   a first current switching device (219) for switching a first control current to the current amplifier arrangement, and
   a second current switching device (220) for switching a second control current to the current amplifier arrangement,
   wherein an impedance of a flowing path of the first control current in said first current switching device and an impedance of a flowing path of the second control current in said second current switching device make an electrical potential of said current amplifier arrangement to float in respect of a supply voltage of the electric device.

2. A device according to claim 1, characterized in that it comprises a first supply voltage connection (226) for providing a voltage level which is higher than any voltage level occurring in the twin cable (204), and a second supply voltage connection (227) for providing a voltage level which is lower than any voltage level occurring in the twin cable (204), whereby said first current switching device (219) is coupled to the first supply voltage connection and said second current switching device (220) is coupled to the second supply voltage connection.

3. A device according to claim 2, characterized in that said first current switching device is a double current mirror (219) with a first output (222) and a second output (223), and said second current switching device is a second current mirror (220) with a control input (225) and an input for the controlled current (224), whereby the first output (222) of the double current mirror is coupled to the current amplifier arrangement, and the second output (223) is coupled to the control input (225) of the second current mirror, and the input for the controlled current (224) of the second current mirror is coupled to the current amplifier arrangement.

4. A device according to claim 3, characterized in that said double current mirror (219) comprises a control input (221), whereby said device comprises means (206, 210, 211, 231, 351) for forming the signal to be led to the control input of the double current mirror as a sum of the signal corresponding to the measured voltage of the twin cable and the alternating voltage signal given by the control unit.

5. A device according to claim 4, characterized in that said means for forming the signal to be led to the control input of the double current mirror comprise an isolation amplifier (210, 351) coupled to the twin cable and a current generator (231) coupled to the output of said isolation amplifier via a low pass filter (211), and means for summing the alternating current signal (206) given by the control unit to the signal received from the output of said low pass filter.

6. A device according to claim 4, characterized in that said double current mirror also comprises an input of the enable/disable type for controlling the double current mirror by means of selection pulses (207) given by the control unit.

7. A device according to claim 1, characterized in that said current amplifier arrangement comprises a first current amplifier (314) and a second current amplifier (340) connected in parallel to the twin cable, which constitute a complementary pair.

8. A device according to claim 7, characterized in that
it comprises a first supply voltage connection (226) for providing a voltage level which is higher than any voltage level occurring in the twin cable, and a second supply voltage connection (227) for providing a voltage level which is lower than any voltage level occurring in the twin cable, whereby said first current switching device (219) is coupled to the first supply voltage connection and said second current switching device (220) is coupled to the second supply voltage connection, and said first current switching device is a double current mirror (219) with a first output (222) and a second output (223), and said second current switching device is a second current mirror (220) with a control input (225) and an input for the controlled current (224), whereby the first output (222) of the double current mirror (222) is coupled to the first current amplifier (314), and the second output (223) is coupled to the control input (225) of the second current mirror, and the input for the controlled current (224) of the second current mirror is coupled to the second current amplifier (340).

9. A method for simulating an analogue telephone apparatus in a twin cable connected to a data transfer device, characterized in that the loop current fed into the twin cable from its other end is amplified by means of a current amplifier arrangement, and said current amplifier arrangement is controlled by means of a first current switching device and a second current switching device and an electrical potential of said current amplifier arrangement is made to float in respect of a supply voltage by a control current in the first current switching device through an impedance of a current path in said first current switching device and by a control current in the second current switching device through an impedance of a current path in said second current switching device.

10. A method according to claim 9, characterized in that the control of a current amplifier arrangement by the first current switching device and the second current switching device is used for transmitting audio frequency signals between a telephone exchange and a digital transfer system, for switching a loop current in a twin cable, for transmitting selection pulses from a digital transfer system to a telephone exchange and for electrical isolation between components connected to the twin cable and components connected to the digital transfer system.

11. An electric device (201, 301) for connecting an analogue data transfer device (202) by means of a control unit (203) to a digital transfer system, comprising means for connecting to a data transfer device with a twin cable (204), characterized in that it comprises a current amplifier arrangement (214, 314, 340) for looping a certain current fed into the twin cable from its other end, a first current switching device (219) for switching a first control current to the current amplifier arrangement, and a second current switching device (220) for switching a second control current to the current amplifier arrangement, and a first supply voltage connection (226) for providing a voltage level which is higher than any voltage level occurring in the twin cable (204), and a second supply voltage connection (227) for providing a voltage level which is lower than any voltage level occurring in the twin cable (204), whereby said first current switching device (219) is coupled to the first supply voltage connection and said second current switching device (220) is coupled to the second supply voltage connection.

12. A device according to claim 11, characterized in that said first current switching device is a double current mirror (219) with a first output (222) and a second output (223), and said second current switching device is a second current mirror (220) with a control input (225) and an input for the controlled current (224), whereby the first output (222) of the double current mirror is coupled to the current amplifier arrangement, and the second output (223) is coupled to the control input (225) of the second current mirror, and the input for the controlled current (224) of the second current mirror is coupled to the current amplifier arrangement.

13. A device according to claim 12, characterized in that said double current mirror (219) comprises a control input (221), whereby said device comprises means (206, 210, 211, 231, 351) for forming the signal to be led to the control input of the double current mirror as a sum of the signal corresponding to the measured voltage of the twin cable and the alternating voltage signal given by the control unit.

14. A device according to claim 13, characterized in that said means for forming the signal to be led to the control input of the double current mirror comprise an isolation amplifier (210, 351) coupled to the twin cable and a current generator (231) coupled to the output of said isolation amplifier via a low pass filter (211), and means for summing the alternating current signal (206) given by the control unit to the signal received from the output of said low pass filter.

15. A device according to claim 13, characterized in that said double current mirror also comprises an input of the enable/disable type for controlling the double current mirror by means of selection pulses (207) given by the control unit.

16. A device according to claim 11, characterized in that said current amplifier arrangement comprises a first current amplifier (314) and a second current amplifier (340) connected in parallel to the twin cable, which constitute a complementary pair.

17. A device according to claim 16, characterized in that said first current switching device is a double current mirror (219) with a first output (222) and a second output (223), and said second current switching device is a second current mirror (220) with a control input (225) and an input for the controlled current (224), whereby the first output (222) of the double current mirror (222) is coupled to the first current amplifier (314), and the second output (223) is coupled to the control input (225) of the second current mirror, and the input for the controlled current (224) of the second current mirror is coupled to the second current amplifier (340).

* * * * *